Figure 1:
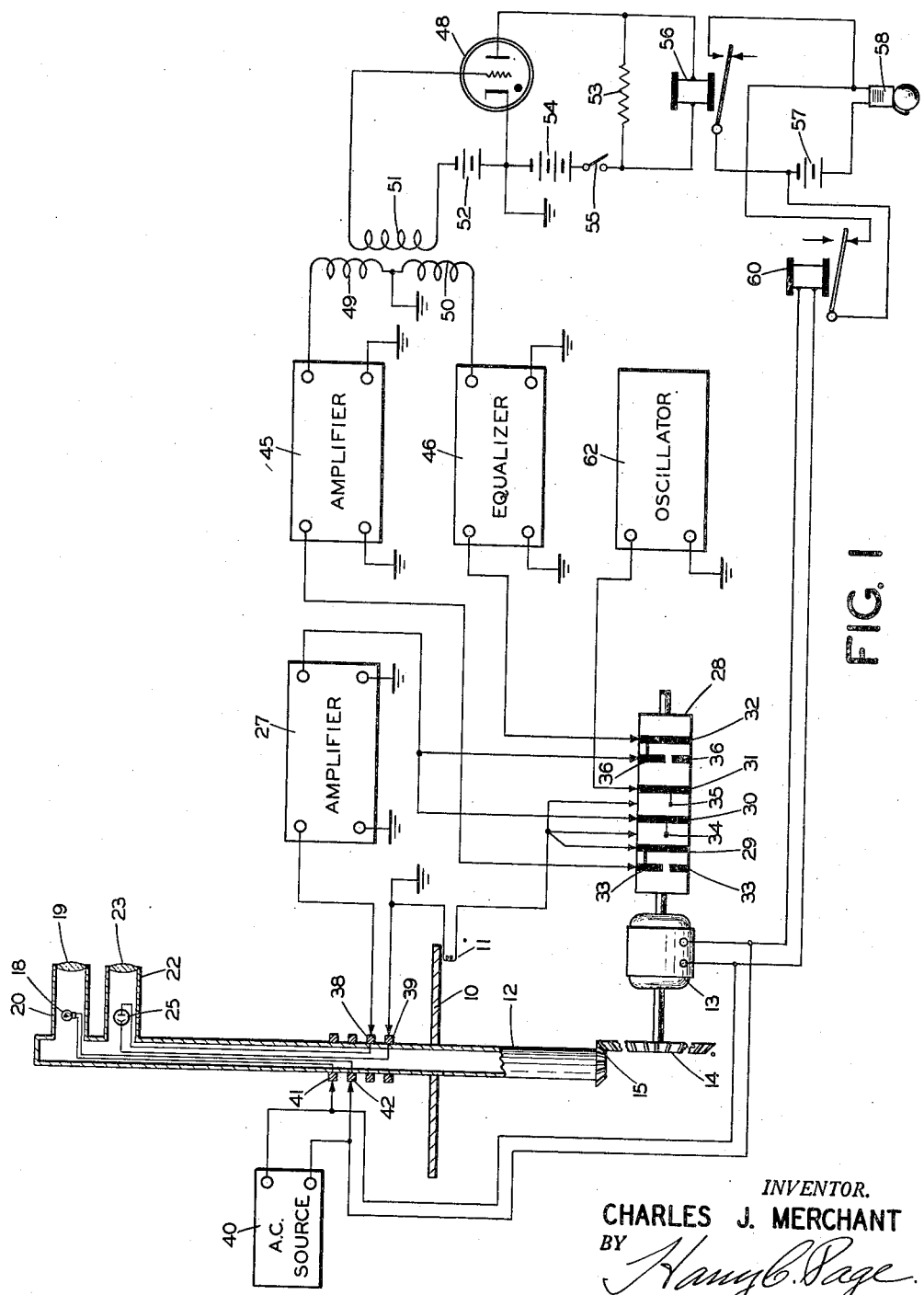

Jan. 3, 1950     C. J. MERCHANT     2,493,543
MONITORING SYSTEM OF COMPARATOR TYPE
Filed Sept. 8, 1947     2 Sheets-Sheet 1

INVENTOR.
CHARLES J. MERCHANT
BY
*Harry C. Page*
ATTORNEY

Jan. 3, 1950  C. J. MERCHANT  2,493,543
MONITORING SYSTEM OF COMPARATOR TYPE
Filed Sept. 8, 1947  2 Sheets-Sheet 2
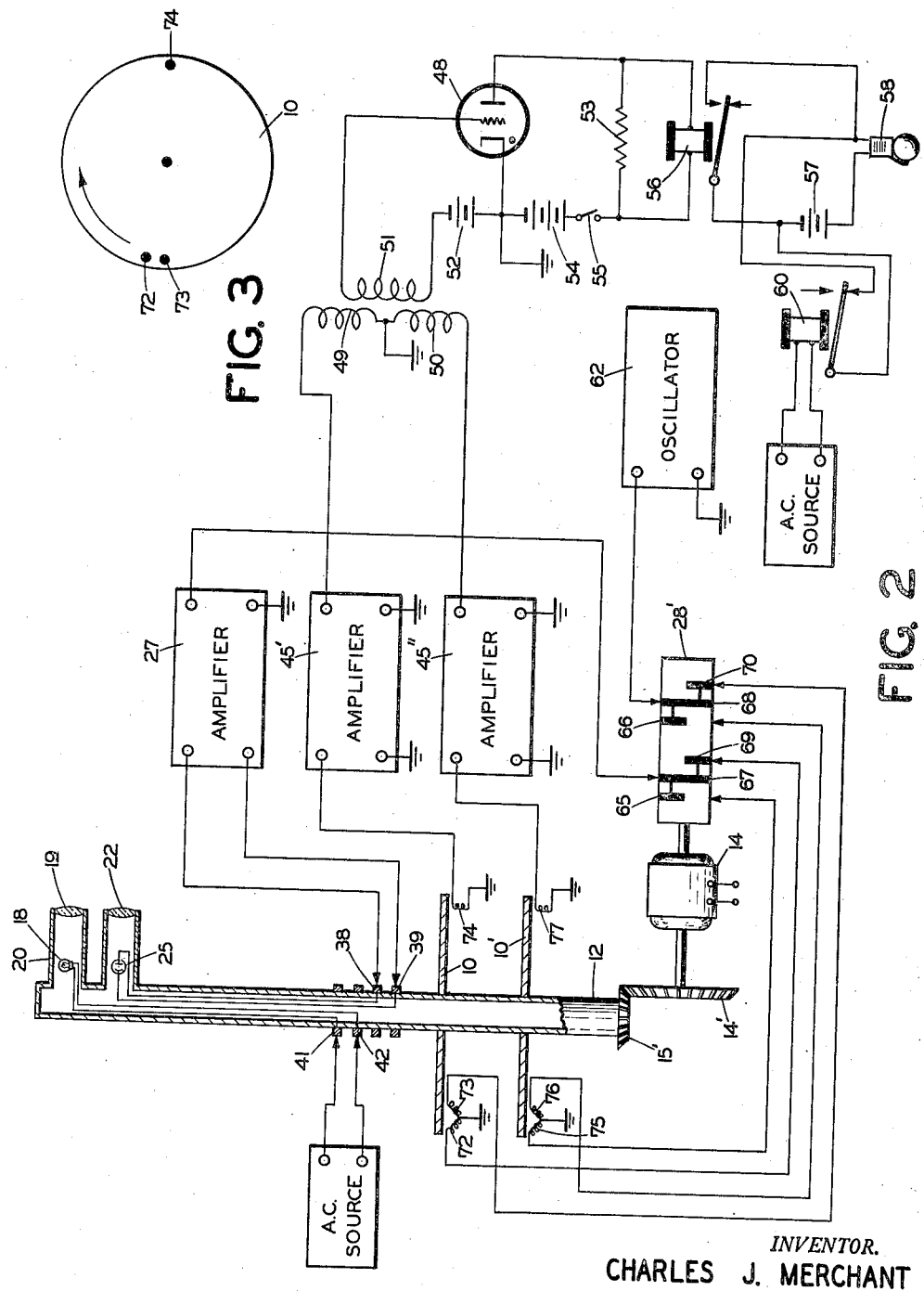
INVENTOR.
CHARLES J. MERCHANT
BY Harry C. Page
ATTORNEY Patented Jan. 3, 1950

2,493,543

UNITED STATES PATENT OFFICE 2,493,543

MONITORING SYSTEM OF COMPARATOR TYPE

Charles J. Merchant, Cleveland Heights, Ohio, assignor to The Brush Development Company, Cleveland, Ohio, a corporation of Ohio Application September 8, 1947, Serial No. 772,815

4 Claims. (Cl. 250—200)

This invention relates generally to monitoring systems for comparing an article or a view with a subsequent article or view and is specifically directed to an arrangement for detecting changes.

There are many uses for a monitoring system in which an article or a view is subsequently compared with a succeeding article or view in order to determine whether any changes have taken place. Thus such arrangements are sometimes used for monitoring articles or material which is being made on a production basis in order to detect changes which take place in a production line. A very satisfactory burglar alarm is provided by an arrangement which compares one view of a scene or room with a subsequent view of the same scene or same room in order to determine whether any changes have taken place in the meantime. Such an arrangement, for example, can be made to show the presence of an intruder, smoke, fire, etc. Such monitoring systems of the comparator type may also be useful in supervising the traffic or parking of airplanes along an air strip, for comparing the signals received in one radar scan with those received during a subsequent scan, etc.

Monitoring systems which have been hitherto available have not been such as to to provide an appreciable "memory." A memory is necessary if a comparison of an article or scene is to be made with a subsequent article or scene. The memory or storage systems which have hitherto been used have been deficient primarily in that they have not been suitable for unattended use and in that the systems have not been such as to provide a convenient and easy change of the record with which the comparison is made.

It is an object of the invention, therefore, to provide a monitoring system of the comparator type which is not subject to one or more of the above-mentioned disadvantages of prior such systems.

It is also an object of the invention to provide an improved monitoring system of the comparator type.

It is still another object of the invention to provide a motion-indicating system which is relatively simple and inexpensive and in which the system may be effective to detect motion at any point within a given area or field regardless of the fact that the area or the field may not be enclosed.

In accordance with the invention a monitoring system comprises, recording and reproducing means, means for scanning a field to derive a first set of signals varying in accordance with the field scanned, and means for recording these signals on the recording means. The arrangement also comprises means for subsequently scanning this field in the same manner used in the first-mentioned scanning to derive a second set of signals varying in accordance with the field scanned, together with means for deriving the recorded signals from the recording means and for synchronously comparing the last-named signals with the above-mentioned second set of signals. This comparison is made to detect any changes in the field between the above-mentioned scannings.

After the above sequence has taken place, the recording can be erased and the process repeated, or, if desired, the recording can be retained for comparison purposes until it is changed at the will of the operator, as, for example, where the articles or materials in a production line are compared with a standard represented by the recording and where the operator changes the standard by any suitable means. When used as a burglar alarm, the recording may be retained until changed by the operator although it is preferable to cause the record to change periodically in an automatic manner as described more fully hereinafter.

For a better understanding of the present invention, together with other and further objects thereof, reference is had to the following description taken in connection with the accompanying drawings and the scope will be pointed out in the appended claims.

In the drawings, Fig. 1 is an illustration of a monitoring system in accordance with the invention; Fig. 2 illustrates a further modification of the invention; and Fig. 3 is utilized to explain a portion of the operation of the system of Fig. 2.

Referring now more particularly to the drawings, there is illustrated in Fig. 1 a monitoring system which comprises a recording and reproducing means. While, in general, any type of recording and reproducing can be utilized, the preferred embodiments of my invention utilize recording and reproducing means of the magnetic type, primarily for the reason that the steps of recording and reproducing are very much simpler in magnetic arrangements and also for the reason that, in a magnetic system, the recording can easily be erased. Thus, in Fig. 1 the recording and reproducing means comprises a disk 10, which may be of brass with a plating of magnetic material on the lower face thereof, and a magnetic recording and reproducing head represented by a coil 11, the disk 10 being mounted upon a shaft 12 and being driven by a motor 13 through gears 14, 15.

The arrangement of the invention also includes means for scanning a field to derive a first set of signals varying in accordance with the field scanned. This scanning means may comprise a Nipkow disk or an electronic arrangement for scanning a rectangular field or may comprise a radar-antenna scanning system or a source of infra-red or ultra-violet light. If desired, a source of sound signals or of ultra-sonic signals may be used in scanning. However, a preferred embodiment of the invention is that illustrated in Fig. 1 in which the monitoring system is embodied in a device which may be a burglar alarm. In Fig. 1, the means for scanning comprises a light source 18 mounted for rotation upon shaft 12 and adapted, by means of a lens 19 included within a housing 20, to provide a light spot which also rotates with the shaft 12. If desired, masking means may be provided so that a narrow vertical ribbon of light is provided. Also mounted on the shaft 12 is a second housing 22 which includes a lens 23 for receiving reflected light from all objects upon which lens 19 projects light. A photocell 25 is included within the housing 22 in order to develop electrical signals from variations of the light picked up by lens 23.

The arrangement of Fig. 1 also includes means for recording the above-mentioned electrical signals on the recording medium which includes disk 10. This last-named means includes a switching arrangement for connecting the electrical output of photocell 25 to the recording head 11 through an amplifier 27. The switching arrangement mentioned above includes a drum 28 which is driven by the motor 13 and upon which are mounted slip rings and commutator segments to provide the above-mentioned switching together with further switching which will be described subsequently. The drum 28 includes slip rings 29, 30, 31 and 32 and commutator segments 33, 34, 35, and 36, each slip ring and commutator segment having a brush effective therewith as indicated by the arrows in the drawings. The signal output of photocell 25 is taken from slip rings 38, 39 on shaft 12 and the light 18 is energized from an A. C. source 40 through slip rings 41 and 42 also on the shaft 12. The A. C. source 40 is also used to drive the motor 13.

The arrangement of Fig. 1 also comprises means for subsequently scanning the above-mentioned field or view in the same manner used in the first-mentioned scanning to derive a second set of signals varying in accordance with the field scanned. This is done in the arrangement of Fig. 1 by a subsequent rotation of the shaft 12 in order to cause the beam from source 18 to scan the same field that was scanned in the previous rotation of the shaft.

The arrangement also comprises means for deriving the signals which were previously recorded on the disk 10 and for synchronously comparing these last-named signals with the set of signals derived as a result of the above-mentioned second or subsequent scanning. This is done to detect changes in the field between the scannings. Thus there is provided an amplifier 45 for amplifying the signals which have been recorded on disk 10 and an equalizer 46 for distorting the signals which are picked up by the above-mentioned subsequent or second scanning in the same manner that the signals picked up by the first scanning are distorted due to being recorded on the disk 10 and subsequently derived therefrom and amplified in amplifier 45.

In order to compare the signal outputs of amplifier 45 and equalizer 46, they are connected with opposite polarity to the input circuit of a vapor-filled tube 48 by means of a transformer having primary windings 49, 50 and a secondary winding 51. A bias source 52 is provided in the input circuit of tube 48 in order to maintain the tube normally non-conductive in the absence of an input signal thereto.

The output circuit of tube 48 includes a load resistor 53, a source of power supply 54, and a switch 55. Signals which cause the vapor-filled tube 48 to fire are effective to energize a relay 56, the contacts of which are utilized to connect source 57 to a bell or alarm device 58.

In order to cause the bell 58 to ring in case the power supply fails or is disconnected, normally closed contacts of a relay 60, which is energized from the power source 40, are connected in parallel with the normally open contacts of relay 56 which are utilized to close the bell circuit when the tube 48 fires.

In order to erase the record which has been provided on disk 10, a high-frequency oscillator 62 is provided and is adapted to be connected to the head 11 through slip ring 31 and commutator segment 35.

In considering the operation of the system which has just been described, it will first be assumed that the ratio of the gears 14, 15 between shaft 12 and the shaft of motor 13 is such that shaft 12 makes many revolutions, for example, 50 revolutions, for one revolution of the motor shaft. It will further be assumed that the commutator segment 34 is only of sufficient length that the coil 11 is energized for recording during exactly one complete revolution of the shaft 12. It will further be assumed that the commutator segment 33 is of sufficient length and is so oriented that the amplifier 45 is connected to the coil 11 for 48 revolutions of shaft 12 immediately following the revolution of shaft 12 during which the recording is made through commutator segment 34. It will also be assumed that the commutator segment 36 is identical with commutator segment 33 so that the equalizer 46 is connected to the output circuit of amplifier 27 during the entire interval of time that the amplifier 45 is connected to coil 11 for reproducing the record previously made on disk 10. It is furthermore assumed that the oscillator 62 is connected to the coil 11, through the commutator segment 65, for one complete revolution of the shaft 12 immediately following the above-mentioned 48 revolutions during which the equalizer 46 is connected to the amplifier 47 through commutator segment 36. Under the conditions stated it will be seen that, when power is supplied to the system from the A. C. source 40, the motor 13 is energized to cause the shaft 12 to rotate to scan the room or field of view with a light beam or ribbon from source 18 and that reflected light from this beam or ribbon is focused by lens 23 on photocell 25, thereby to generate electrical potentials varying in accordance with the scene or field scanned. Also, as soon as power is supplied to the system, the relay 60 picks up thereby de-energizing the bell 58. Thus under the conditions described, the bell 58 is silent because switch 55 is open.

The switch 55 is preferably located outside of the field or scene which is scanned by the light from the source 18. It may, for example, be associated with the lock of the door of the building in which the arrangement of Fig. 1 is to be utilized as a burglar alarm. It will now be assumed that the switch 55 is closed by the last person to leave the building, for example, by the act of locking the door. Under these conditions, it will be seen that, during one complete revolution when contact segment 34 is effective, the room, scene, or field is scanned by the light beam and the signals developed in photocell 25 are applied to the coil 11 through the amplifier 27 and the commutator segment 34. This causes a recording to be effected on a magnetic material of disk 10 during this complete revolution of shaft 12. Immediately after this revolution of shaft 12 and for the next 48 revolutions of shaft 12, the output signals of the photocell 25 are connected through amplifier 27, commutator segment 36 and equalizer 46 to the winding 50 in the input circuit of tube 48. Also, during this same interval of time, the winding 11, which picks up the signals which have previously been recorded on disk 10, is connected to the winding 49 in the input circuit of tube 48 through contactor segment 33 and amplifier 45. If there is no change in the view or scene which was scanned originally by the beam 19 and which is again scanned during the above-mentioned 48 revolutions of shaft 12, equal and opposite signals appear in windings 49 and 50 and no signals are applied to the input circuit of the tube 48. However, any change in the field scanned during the 48 revolutions of shaft 12, as distinguished from the field scanned during the first revolution of shaft 12, results in an input signal to tube 48 which causes the tube to fire.

Transformer 49, 50 and 51 is preferably of the peaking type so that a positive signal pulse is always derived from any pulse signal which is effectively applied thereto regardless of whether or not this pulse signal is positive or negative. When the tube 48 fires, the relay 56 is energized causing the bell 58 to sound an alarm. Assuming, however, that the above-mentioned 48 revolutions take place without causing tube 48 to be energized, the oscillator 62 is connected to the coil 11 during the next complete revolution of shaft 12 through the commutator segment 35, thereby to erase the entire recording on disk 10. After this sequence of events, the cycle is again repeated continuously so that, at any time a change takes place in the field scanned by the light beam 18, the alarm 58 is energized. In a preferred embodiment of the invention the shaft 12 is caused to rotate at a speed of one revolution per second.

The arrangement of Fig. 2 is generally similar to that of Fig. 1 and similar circuit elements have identical reference numerals, while analogous circuit elements have identical reference numerals primed. The circuit of Fig. 2 differs from Fig. 1, however, in that two recording disks 10 and 10' are provided on the shaft 12. Also, in Fig. 2 the ratio of gears 14', 15' is such that the shaft 12 makes two revolutions for each revolution of motor 14. The drum 28' in Fig. 2 differs from drum 28 in Fig. 1 in that commutator segments 65 and 66, connected respectively to slip rings 67 and 68, are each contacted by their cooperating brushes during one-half revolution of drum 28'. Similarly, contact segments 69 and 70 are contacted during the succeeding half revolution of drum 28'.

In the arrangement of Fig. 2 separate erasing, recording and reproducing coils are provided for disks 10 and 10'. Thus the disk 10 comprises a recording coil 72, an erasing coil 73 and a reproducing coil 74, while the disk 10' comprises a recording coil 75, an erase coil 76, and a reproducing coil 77. The reproducing coils 74 and 77 are connected, respectively, to windings 49 and 50 of the input transformer of tube 48 through amplifiers 45' and 45''. The recording coils 72 and 75, respectively, are connected to the brushes which contact commutator segments 69 and 65, respectively. The erase coils 73 and 76 are connected, respectively, to the brushes which contact commutator segment 70 and commutator segment 66. The angular disposition of the recording coil, the erase coil and the reproducing coil of disk 10 are illustrated in Fig. 3 by the correspondingly numbered dots which indicate relative position. The coils cooperating with disk 10' are similarly located around disk 10'.

In considering the operation of the arrangement just described, it will be assumed that power has been supplied to the system to cause relay 60 to de-energize the bell 58 and that the switch 55 has been closed by locking a door in which the system is included as a burglar alarm. It will be seen that, during a complete revolution of the disk 10, for example, the erasing coil 73 and the recording coil 72 are connected, through contact segments 70 and 69, respectively, to the oscillator 62 and to the output circuit of amplifier 27, respectively. Under these conditions, and assuming a clockwise rotation of the disk 10 as indicated in Fig. 3, all recordings which have previously been made on the disk 10 are erased due to the energization of winding 73 from the oscillator 62, but immediately thereafter a new recording is placed upon the disk 10 due to the fact that the recording coil 72 is connected to the photocell 25 through the amplifier 27, slip ring 67, and commutator segment 69.

It will also be seen that, during the next complete revolution of shaft 12, the coils 72 and 73 are deenergized and the previous recording remains on disk 10. However, during this next revolution of shaft 12, recording coil 75 is connected to the photocell 25 through the amplifier 27, slip ring 67 and commutator segment 65 while the erase coil 76 is connected to the oscillator 62 through the commutator segment 66 and the slip ring 68. For the third revolution of shaft 12, the coils 72 and 73 are again energized, as described in connection with the first revolution of shaft 12, while during the fourth revolution of shaft 12 the coils 75 and 76 are energized, as described in connection with the second revolution of shaft 12. This process repeats indefinitely.

Under the conditions described there are always present on the disks 10 and 10', at the positions of the reproducing coils 74 and 77, respectively, a recorded signal. This recorded signal on one of the disks corresponds to the current revolution of the shaft 12, while the record on the other of the disks corresponds to the preceding revolution of shaft 12. Thus, the differential input to winding 51 always provides a synchronous comparison of the scanning of one field by light 18 with the scanning of the previous field by light 18. Any change in these succeeding fields causes relay 48 to be energized and the alarm 58 to be actuated in the manner described in detail in connection with the description of Fig. 1. This description will not be repeated here.

In the arrangement of Fig. 1 it will be seen that, during one scanning cycle, a record is made which is thereafter compared with the signals picked up during the next 48 scanning cycles. Such an arrangement, therefore, is effective to provide an arrangement in which very minute or slow changes in the field being scanned are detected. In the arrangement of Fig. 2, on the other hand, the system is such that the signals derived during the scanning of one field are always compared with the signals derived during the preceding scanning of the field. The system of Fig. 2 is thus effective to detect radical changes which take place between the scannings. However, it will be understood that various combinations of these two systems can easily be effected by changing the gear ratios involved in the drive between the shaft of motor 14 and the shaft 12 and by changing the switching provided by the commutator segments of the motor-driven commutator. It will also be understood that the principles of both systems can be used simultaneously to detect fast and slow changes.

It will be understood that, in some cases, the light source 18 can be omitted and a non-directional source of radiant energy used instead. Sunlight may be used as the source of radiant energy, if desired.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A monitoring system comprising: recording and reproducing means; means for scanning a field to derive a first set of signals varying in accordance with the field scanned; means for recording said signals on said recording means; means for subsequently scanning said field in the same manner used in said first-mentioned scanning to derive a second set of signals varying in accordance with the field scanned; means for recording said second set of signals on said recording means; and means for reproducing said recorded signals and for synchronously comparing the reproduced signals corresponding to said first-mentioned scanning and said reproduced signals corresponding to said subsequent scanning, thereby to detect any changes in said field between said scannings.

2. A monitoring system as set forth in claim 1, further characterized by said means for scanning a field including a light source for providing a light beam of restricted area.

3. A monitoring system as set forth in claim 1, further characterized by said means for scanning a field including a source of radiant energy and a receiver of reflected radiant energy spaced away from said source of radiant energy.

4. A monitoring system as set forth in claim 1, further characterized by said means for scanning a field including a light source for providing a light beam of restricted area and a photoelectric cell receiver of reflected light spaced away from said light source.

CHARLES J. MERCHANT.

REFERENCES CITED

The following references are of record in the file of this patent:

UNITED STATES PATENTS

| Number | Name | Date |
|---|---|---|
| 2,410,424 | Brown | Nov. 6, 1946 |
| 2,411,494 | Bliss | Nov. 19, 1946 |